United States Patent [19]
Griffiths

[11] 3,975,651
[45] Aug. 17, 1976

[54] METHOD AND MEANS OF GENERATING ELECTRICAL ENERGY

[76] Inventor: Norman David Griffiths, 55, Seedfield Croft, Coventry, West Midlands, England

[22] Filed: Mar. 27, 1975

[21] Appl. No.: 562,457

[30] Foreign Application Priority Data

Mar. 27, 1974 United Kingdom............ 13689/74

[52] U.S. Cl. .................................................. 310/11
[51] Int. Cl.² ........................................... H02N 4/02
[58] Field of Search ..................... 310/4, 10, 11, 5, 6

[56] References Cited
UNITED STATES PATENTS

| | | | |
|---|---|---|---|
| 3,122,663 | 2/1964 | Kach | 310/11 |
| 3,149,247 | 9/1964 | Cobine et al. | 310/11 |
| 3,214,614 | 10/1965 | Maeder | 310/11 |
| 3,440,458 | 4/1969 | Knight | 310/11 |
| 3,553,503 | 1/1971 | O'Hare | 310/11 |
| 3,660,700 | 5/1972 | Aisenberg | 310/11 |

OTHER PUBLICATIONS
"Geomagnetism," Chapman & Bartles, 1940; pp. 445–440.

*Primary Examiner*—Donovan F. Duggan
*Attorney, Agent, or Firm*—Watson, Cole, Grindle & Watson

[57] ABSTRACT

A method and apparatus of generating electrical energy either as direct or alternating current output wherein an electric current is passed axially through a continuous flow of electrically conductive fluid in a duct member, the fluid is moved at a high velocity so that the circumferential magnetic field due to the electric current travels with the fluid and induces radially directed electromotive forces and current flow in a further conductive device disposed exteriorly about the duct member.

6 Claims, 4 Drawing Figures

U.S. Patent  Aug. 17, 1976  3,975,651

METHOD AND MEANS OF GENERATING ELECTRICAL ENERGY

The object of this invention is to provide an improved method and means of generating electrical energy.

The present invention includes passing an electric current along a conductive fluid so as to create a magnetic field about said fluid and moving said fluid at high velocity relative to further conductive means whereby radially directed electromotive forces are induced in the latter by the action of the magnetic field travelling with the fluid.

Figure 1:
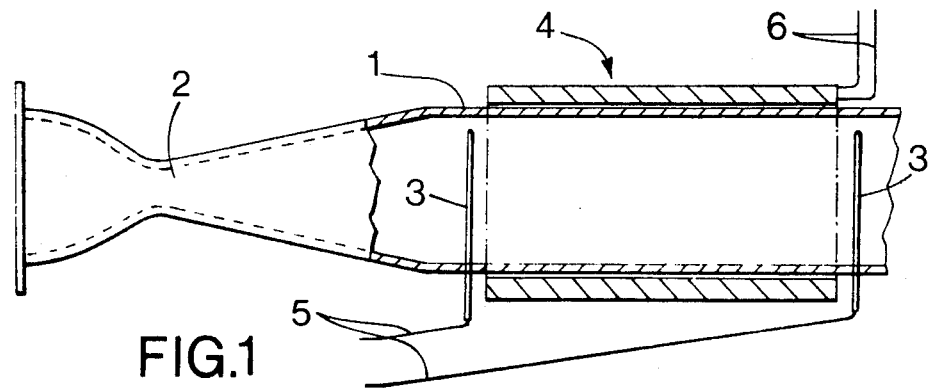
Figure 2:
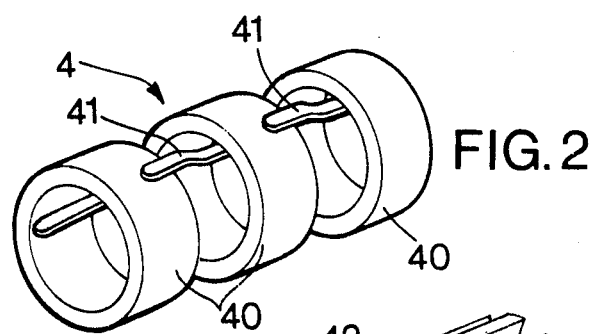
Figure 3:
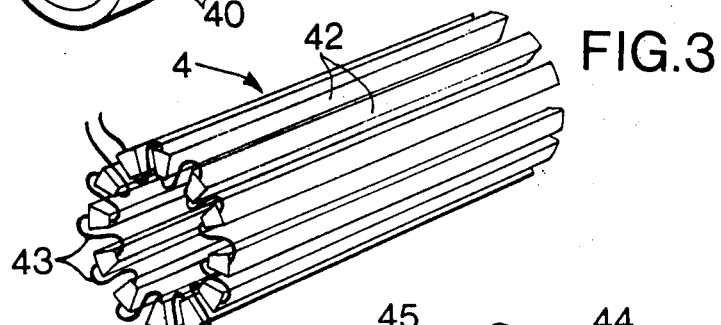
Figure 4:
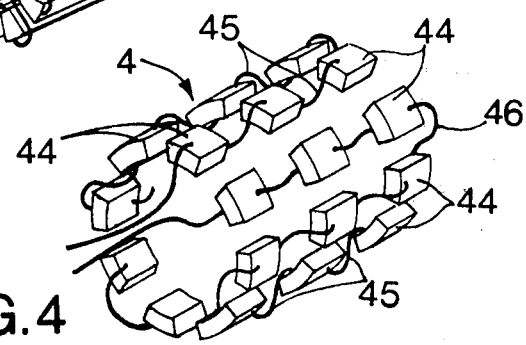

In practice the procedure is as follows, reference being had to the accompanying drawings in which:

FIG. 1 is a diagrammatic partly axial plane section of a system for carrying out the method of generating electrical energy, and FIGS. 2 to 4 are detail perspective views each showing an alternative form of the further conductive mechanism in which electrical current flow is induced.

A tubular duct 1 is provided along which an electrically conductive fluid is passed at high velocity having been accelerated by the venturi form of the duct indicated at 2.

Any suitable fluid having a high degree of electrical conductivity may be employed in the form of a liquid, gas or plasma, and it is preferable that the fluid be non-corrosive, not highly inflammable and non-toxic. Thus water, an inert conductive gas, liquid metal, or conductive oil may be used, or any suitable liquid or gas containing an electrically conductive agent.

Flow of the fluid along the duct 1 may be created in various ways. Thus gravitational flow of water may be employed e.g. from a natural source or reservoir in order to create hydrostatic pressure and corresponding high velocity flow along the duct 1. Alternatively the fluid may be mechanically pumped while further kinetic energy may be added to the moving fluid in the form of heat from a boiler or heat exchanger.

In a further alternative arrangement internal combustion may be employed i.e. by feeding fuel and air under pressure into a combustion chamber from which the burnt or burning gases pass to the duct 1. A conductive agent is introduced into duct 1 as necessary so as to provide conductive fluid flow along the duct 1.

The moving conductive fluid in the duct 1 has current passed axially through it by suitable contact electrodes 3 which enter the duct 1. This section of the duct 1 containing fluid which is carrying the current between the electrodes 3 must be electrically insulating. As a result of the current a magnetic field is created around the conductive fluid and moves with the latter at high velocity. The moving magnetic field is circumferential and the lines of flux pass relative to further conductive means in the form of a cylindrical member 4 coaxially disposed about the duct 1. As a result an electromotive force is induced in the member 4 in a radial direction.

The arrangement of the member 4 is such that it conforms to Fleming's right hand rule as regards current flow direction. Thus the electromotive force induced in the member 4 adjacent to the circumferential exterior of the duct 1 will cause a current to flow radially in the member 4. Therefore a thick conductive cylindrical or annular member or assembly at 4 around the exterior of the duct 1 will have a potential difference between its inner and outer surfaces. However in order to increase the output voltage the cylindrical member 4 may be divided into a number of elements each electrically connected in series, the increased output voltage obtainable being at the expense of output current.

As shown in FIG. 2 the cylindrical member 4 may be divided into a longitudinal series of annular elements 40 of which the outer surface of one is electrically connected at 41 to the interior surface of the next, the annular elements 40 being thus connected in series in this way.

In FIG. 3 the elements of the cylindrical member 4 are shown consisting of a number of parallel longitudinal segments or strips 42 of which the inner surface of one strip is electrically connected at 43 to the outer surface of the next adjacent strip so that all the strips are connected in this way in series.

In FIG. 4 the cylindrical member 4 consists of a plurality of segments in the form of blocks 44 of which the outer surface of any one block is electrically connected at 45 to the inner surface of the next block, each longitudinal line of blocks 44 connected in this way being connected in a similar manner at 46 to the blocks 44 of the next adjacent longitudinal line so that all the blocks are electrically connected in series.

To start the generating process an external source of electrical power is required which is connected at 5 so as to pass an initial polarising current along the conductive fluid between the electrodes 3 before any output can be obtained. Once an output current has been produced a portion, or all of it, may be fed through the conductive fluid to continue the process before it passes to the final output 6 for subsequent use.

If direct current is applied through the fluid between the electrodes 3, the output current obtained at 6 will also be direct. However if an alternating current is employed as the input current between the electrodes 3 then an alternating current output is obtained at 6.

I claim:

1. Method of generating electrical energy comprising:
    passing an electric current in a continuous manner axially through an electrically conductive fluid in an electrically non-conductive duct member so as to create a circumferential magnetic field within the fluid;
    moving the fluid axially and continuously along the duct member at a high velocity relative to a further conductive device disposed exteriorly about the duct member, the further conductive device being formed for enabling radially directed electromotive forces and current flow to occur between inner and outer surfaces thereof and for obtaining resulting output current flow from said surfaces; and
    inducing radially directed electromotive forces and current flow in the further conductive device by the axial movement of the moving circumferentially directed magnetic field as such field travels with the electric current conducting fluid moving along the duct member.

2. Apparatus for generating electrical energy comprising:
    an electrically non-conductive duct member;
    means for passing an electrically conductive fluid at a high velocity axially and continuously along said duct member;
    axially spaced apart electrodes arranged within said duct member for passage of electric current between them in a continuous manner and axially directed along said conductive fluid in said duct member such that a circumferential magnetic field created by the electric current moves with said conductive fluid; and further conductive means disposed exteriorly about said duct member, said further conductive means being formed for enabling radially directed electromotive forces and current flow to occur between inner and outer surfaces thereof and for obtaining resulting output current flow from said surfaces whereby radially directed electromotive forces and current flow are induced in said further conductive means by the axial movement of the circumferential magnetic field relative thereto as such field travels with the electrically conductive fluid as it moves along said duct member.

3. Apparatus as defined in claim 2 wherein said further conductive means is substantially of annular form and has a radial thickness for the induction therein of a radially directed electromotive force and electric current flow between inner and outer surfaces thereof.

4. Apparatus as defined in claim 3 wherein said further conductive means consists of a longitudinally arranged series of substantially annular elements with the inner surface of one element being electrically connected in series to the outer surface of the next adjacent element.

5. Apparatus as defined in claim 3 wherein said further conductive means consists of a number of segmental elements with the inner surface of one segmental element being electrically connected in series to the outer surface of the next segmental element.

6. Apparatus as defined in claim 5 wherein said segmental elements consist of blocks electrically connected in series such that the inner surface of one block is connected to the outer surface of the next block, said blocks being arranged in rows of several blocks, each of said rows being electrically connected in series so that all of said blocks are so connected in series between their inner and outer surfaces.

* * * * *